United States Patent
van Nieuwstadt et al.

(10) Patent No.: US 6,973,776 B2
(45) Date of Patent: Dec. 13, 2005

(54) EXHAUST GAS AFTERTREATMENT SYSTEMS

(75) Inventors: Michiel van Nieuwstadt, Ann Arbor, MI (US); William Ruona, Farmington Hills, MI (US); Devesh Upadhyay, Dearborn, MI (US)

(73) Assignee: Ford Global Technologies, LLC ( * ) Notice: Subject to any disclaimer, the term of this patent is extended or adjusted under 35 U.S.C. 154(b) by 81 days.

(21) Appl. No.: 10/700,223

(22) Filed: Nov. 3, 2003

(65) Prior Publication Data

US 2005/0091968 A1    May 5, 2005

(51) Int. Cl.[7] ............................................. F01N 3/00
(52) U.S. Cl. ..................... 60/286; 60/274; 60/297; 60/303
(58) Field of Search ................ 60/274, 277, 286, 60/295, 297, 303, 311

(56) References Cited

U.S. PATENT DOCUMENTS

| | | | |
|---|---|---|---|
| 5,727,385 A | * | 3/1998 | Hepburn ...................... 60/297 |
| 5,746,989 A | * | 5/1998 | Murachi et al. ......... 423/213.7 |
| 6,314,722 B1 | * | 11/2001 | Matros et al. ................. 60/274 |
| 6,718,757 B2 | * | 4/2004 | Khair et al. ................... 60/286 |
| 6,725,647 B2 | * | 4/2004 | Pfeifer et al. ................. 60/274 |
| 6,742,330 B2 | * | 6/2004 | Genderen ..................... 60/286 |
| 6,766,642 B2 | * | 7/2004 | Binder et al. ................. 60/301 |

* cited by examiner

Primary Examiner—Binh Q. Tran
(74) Attorney, Agent, or Firm—Julia Voutyras; Allan J. Lippa

(57) ABSTRACT

A system for effective NOx control in a diesel or other lean burn internal combustion engine is presented. The system includes a urea-based SCR catalyst having an oxidation catalyst coupled upstream of it and an ALNC coupled upstream of the oxidation catalyst. This system configuration results in improved NOx conversion due to faster SCR catalyst warm-up and higher operating temperatures. Additionally, placing the ALNC upstream of the oxidation catalyst prevents hydrocarbon slip into the SCR catalyst at low exhaust gas temperatures. Also, system reliability is improved by adding an auxiliary NOx aftertreatment device.

7 Claims, 3 Drawing Sheets

EXHAUST GAS AFTERTREATMENT SYSTEMS

FIELD OF INVENTION

The present invention relates to an emission control system for diesel and other lean-burn vehicles and, more specifically, to a new system configuration designed to achieve improved emission control.

BACKGROUND OF THE INVENTION

Current emission control regulations necessitate the use of catalysts in the exhaust systems of automotive vehicles in order to convert carbon monoxide (CO), hydrocarbons (HC), and nitrogen oxides (NOx) produced during engine operation into unregulated exhaust gasses. Vehicles equipped with diesel or another lean burn engine offer the benefit of increased fuel economy, however, control of NOx emissions in such systems is complicated due to the high content of oxygen in the exhaust gas. In this regard, Selective Catalytic Reduction (SCR) catalysts, in which NOx is continuously removed through active injection of a reductant, such as urea, into the exhaust gas mixture entering the catalyst, are know to achieve high NOx conversion efficiency. A typical lean exhaust gas aftertreatment system may also include an oxidation catalyst coupled upstream of the SCR catalyst. The oxidation catalyst converts hydrocarbons (HC), carbon monoxide (CO) and nitrous oxide (NO) in the engine exhaust gas. The oxidation catalyst is also used to supply heat for fast warm up of the SCR catalyst.

The inventors herein have recognized several disadvantages with such system configuration. Namely, because the oxidation catalyst is typically located under-body far downstream of the engine, it takes a significant time to reach light-off temperatures (e.g. 200 deg. C.). This results in delayed warm up for the SCR catalyst, and thus negatively affects emission control. Also, since the oxidation catalyst does not convert the incoming hydrocarbons until it reaches light-off, under some conditions, such as cold start, or extended periods of light load operation, hydrocarbons may slip from the oxidation catalyst and cause the SCR catalyst poisoning.

SUMMARY OF THE INVENTION

Accordingly, the present invention is directed to a system that achieves effective control of NOx emissions in a lean burn engine, such as a diesel engine, while overcoming the disadvantages of the prior art. The system includes an Active Lean NOx catalyst (ALNC), an oxidation catalyst coupled downstream of the ALNC, and a selective catalytic reduction (SCR) catalyst coupled downstream of said Active Lean NOx catalyst.

Such system configuration results in decreased oxidation catalyst light-off time due to the exotherm generated by the ALNC. Also, unlike the oxidation catalyst, the ALNC can store hydrocarbons at low exhaust gas temperatures, therefore SCR catalyst poisoning due to hydrocarbon slip is prevented. Additionally, since the ALNC has NOx conversion capabilities, demands on the SCR catalyst are less severe, and the ALNC can serve as an auxiliary NOx aftertreatment device if the SCR catalyst performance becomes degraded.

An advantage of the present invention is improved emission control due to the reduced emission control system warm-up time. Another advantage of the present invention is improved SCR catalyst durability and NOx conversion efficiency are achieved by eliminating the risk of hydrocarbon poisoning. Yet another advantage of the present invention is improved emission control system reliability due to the presence of an additional NOx aftertreatment device.

The above advantages and other advantages, and features of the present invention will be readily apparent from the following detailed description of the preferred embodiments when taken in connection with the accompanying drawings, and from the claims.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

Figure 1A:
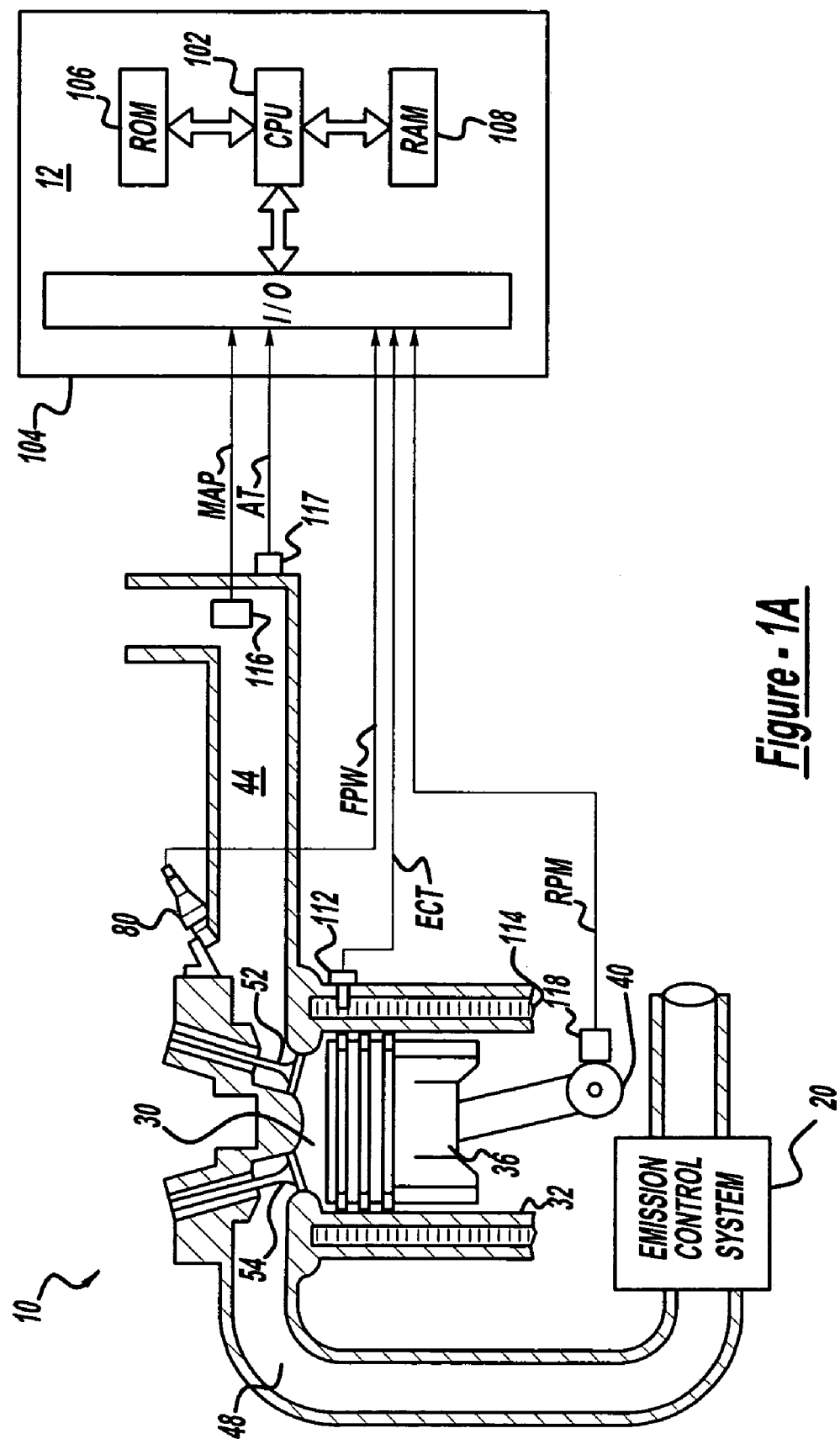
FIGS. 1A and 1B are schematic diagrams of an engine wherein the invention is used to advantage.

Internal combustion engine 10, comprising a plurality of cylinders, one cylinder of which is shown in FIG. 1A, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW and injection timing are adjustable. Fuel is delivered to fuel injector 80 by a fuel system (not shown), including a fuel tank, fuel pump, and fuel rail (not shown).

Controller 12 is shown in FIG. 1A as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40.

An emission control system 20 is coupled to an exhaust manifold 48 and several exemplary embodiments of the system in accordance with the present invention are described with particular reference to FIGS. 2A–2C.

Figure 1B:
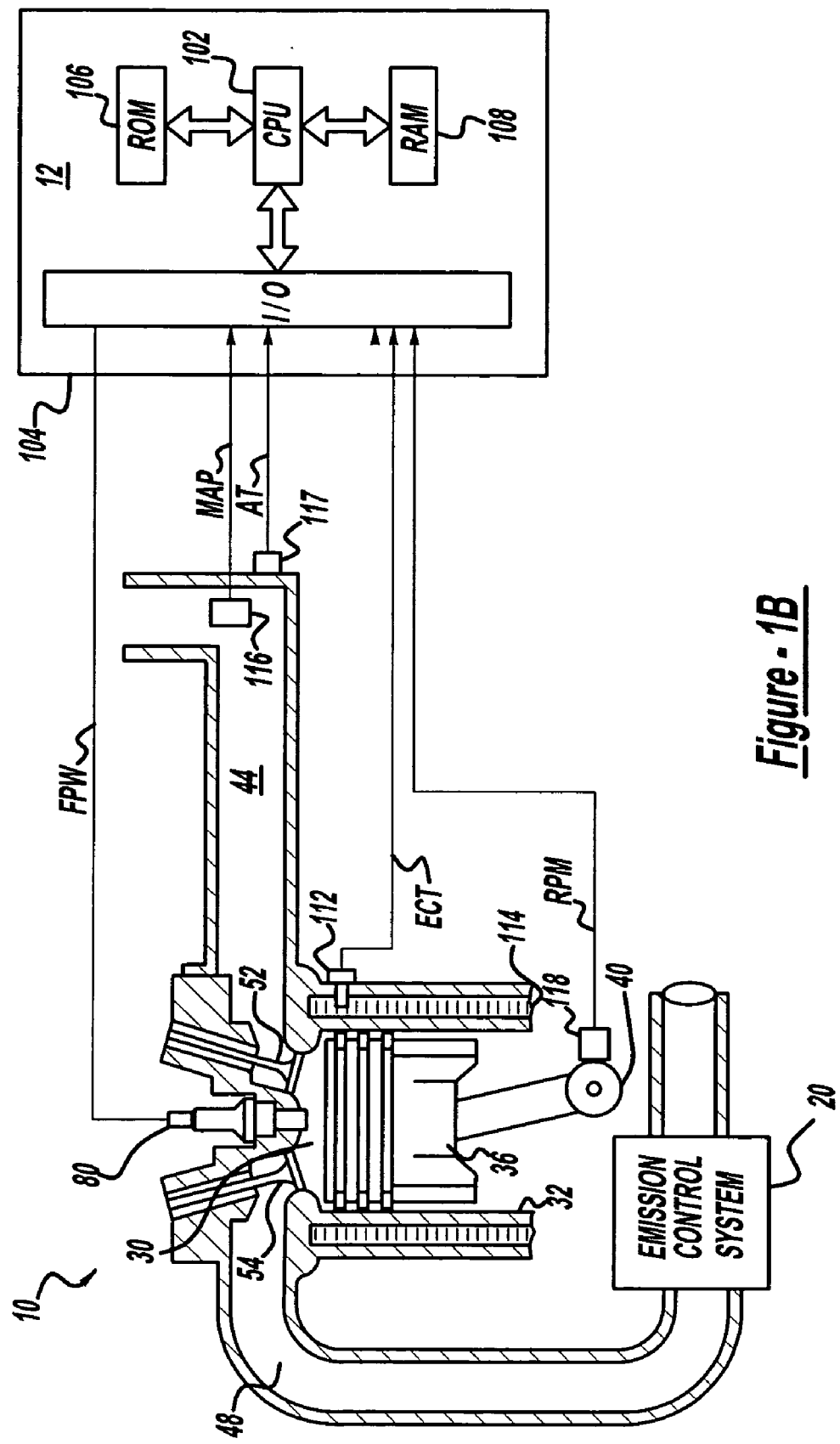

Referring now to FIG. 1B, an alternative embodiment is shown where engine 10 is a direct injection engine with injector 80 located to inject fuel directly into cylinder 30.

Figure 2:
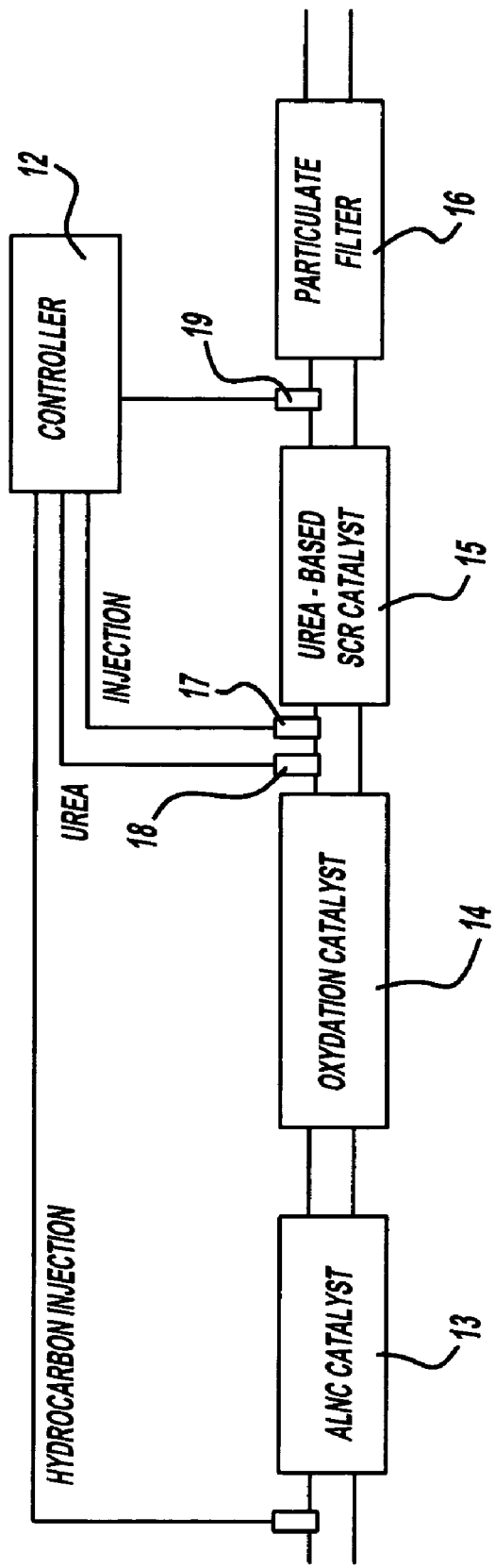
FIG. 2 is a schematic diagram of an exemplary embodiments of an emission control system in accordance with the present invention.

Referring now to FIG. 2, the emission control system 20 includes an Active Lean NOx catalyst (ALNC) 13, an oxidation catalyst 14, a urea-based Selective Catalytic Reduction (SCR) catalyst 15, and a particulate filter 16.

The ALNC catalyst 13 preferably comprises a precious metal or a combination of precious metals, such as Platinum or Palladium, an acidic support material, such as the one containing alumina and silica, and a zeolite material. A reductant injection system 11 is coupled to the exhaust gas manifold upstream of the ALNC. The reductant injection system delivers reductant, such as fuel (HC), from the fuel tank or from a storage vessel (not shown) to the ALNC to improve its NOx conversion efficiency. System 11 may be any system known to those skilled in the art capable of delivering reductant to the NOx-reducing catalyst. Alternatively, any other means known to those skilled in the art to deliver reductant to an exhaust gas aftertreatment device may be used.

The ALNC stores hydrocarbons in the engine feedgas when exhaust gas temperatures are low, such as at engine cold start and during extended periods of light load operation. This prevents hydrocarbon slip into the SCR catalyst at low exhaust gas temperatures. Further, the ALNC is capable of quick warm-up because its small size allows it to be placed close to the engine. Once the ALNC has reached light-off temperatures, extra hydrocarbons may be injected to create an exotherm that in turn will warm up the oxidation catalyst 14 which is located further downstream. Additionally, the feedgas NOx is reduced in the ALNC in the presence of injected hydrocarbons.

Oxidation catalyst 14 is a precious metal catalyst, preferably one containing platinum, for rapid conversion of unreacted hydrocarbons (HC), carbon monoxide (CO) and nitrous oxide (NO) in the exhaust gas mixture exiting the ALNC. Additionally, once the oxidation catalyst reaches light-off temperatures, extra hydrocarbons can be injected into the oxidation catalyst thus to exothermically combust and thus generate heat for fast warm-up of the urea-based Selective Catalytic Reduction (SCR) catalyst 15. Extra hydrocarbons may be supplied to the oxidation catalyst via an injection system 11 upstream of the ALNC, or injected directly into the exhaust gas stream entering the oxidation catalyst via an additional reductant injection system (not shown). Alternatively, engine-related measures, such as, for example, in-cylinder injection during either or both of a power or exhaust stroke of the engine (in a direct injection engine) or any of a number of other alternatives, such as retarding injection timing, increasing EGR and intake throttling, or any other means known to those skilled in the art to increase the HC concentration in the exhaust gas may be used. In other words, once the ALNC catalyst reaches light-off temperatures, extra hydrocarbon injection into the ALNC can be used to achieve quicker light-off for the oxidation catalyst.

The SCR catalyst 15 is, preferably, a base metal/zeolite formulation with optimum NOx conversion performance in the range of 200–350° C. Reductant, such as aqueous urea, is stored in a storage vessel (not shown) and delivered to the SCR catalyst via a reductant injection system 17. Typically, the amount of reductant injected into the SCR catalyst is calibrated to achieve a certain reductant to incoming NOx ratio.

NOx sensors, $NOx_1$ (18) upstream, and $NOx_2$ (19) downstream of the SCR, are coupled in the path of the exhaust gas entering and exiting the SCR catalyst. The outputs of these sensors are read by controller 12 and may be used to determine the NOx conversion efficiency of the SCR. If a determination is made that the SCR performance is degraded, it is possible to use the ALNC as a back-up NOx aftertreatment device. Under such circumstances, urea injection into the SCR catalyst may be reduced or discontinued, and extra reductant may be injected into the ALNC based on an amount of NOx in the engine feedgas. The amount of NOx in the engine feedgas may be measured by an additional NOx sensor (not shown) placed upstream of the ALNC, or, alternatively, may be estimated based on engine speed, load, exhaust gas temperature or any other parameter known to those skilled in the art to affect engine NOx production.

Particulate filter (PF) 15 is coupled downstream of the SCR catalyst and is used to trap particulate matter (soot) generated during the drive cycle of the vehicle. The PF can be manufactured from a variety of materials including cordierite, silicon carbide, and other high temperature oxide ceramics. Once soot accumulation has reached a predetermined level, regeneration of the filter becomes necessary. Filter regeneration is accomplished by heating the filter to a temperature that will burn soot particles at a faster rate than the deposition of new soot particles.

Therefore, according to the present invention, improved emission control can be achieved by placing an ALNC in addition to an oxidation catalyst upstream of a urea-based SCR catalyst. The ALNC generates an exotherm that provides higher exhaust gas temperature during vehicle cold-start and light-load operation and reduces light-off time of the oxidation catalyst resulting in faster warm-up of the SCR catalyst. Additionally, the ALNC stores hydrocarbons when the exhaust gas temperatures are low, thus preventing hydrocarbon slip from the oxidation catalyst into the SCR catalyst during the time period before the oxidation catalyst reaches light-off. Also, the ALNC catalyst may serve as an auxiliary NOx-reducing device in case the SCR catalyst performance is degraded.

In an alternative embodiment (not shown), oxidation catalyst 14 may be eliminated, and the exotherm for warming up the SCR catalyst may be supplied solely by the ALNC.

This concludes the description of the invention. The reading of it by those skilled in the art would bring to mind many alterations and modifications without departing from the spirit and the scope of the invention. Accordingly, it is intended that the scope of the invention be defined by the following claims:

What is claimed is:

1. An exhaust gas aftertreatment system for an internal combustion engine exhaust, the system comprising:
   an Active Lean NOx catalyst (ALNC);
   an oxidation catalyst coupled downstream of said ALNC; and
   a selective catalytic reduction (SCR) catalyst coupled downstream of said oxidation catalyst.

2. The system as set forth in claim 1 wherein the internal combustion engine exhaust is a diesel engine exhaust.

3. The system as set forth in claim 2 further comprising a particulate filter coupled downstream of said SCR catalyst.

4. The system as set forth in claim 3 further comprising a first reductant injection system adapted to inject hydrocarbon into an exhaust gas stream entering said ALNC.

5. The system as set forth in claim 4 further comprising a second reductant injection system adapted to inject aqueous urea into an exhaust gas stream entering said SCR catalyst.

6. An exhaust gas aftertreatment system for an internal combustion engine exhaust, the system comprising:
   an Active Lean NOx catalyst (ALNC); and
   a selective catalytic reduction (SCR) catalyst coupled downstream of said oxidation catalyst.

7. An emission control system, comprising:
   an internal combustion engine;

an Active Lean NOx (ALNC) catalyst coupled downstream of said engine;
an oxidation catalyst coupled downstream of said ALNC;
a urea-based SCR catalyst coupled downstream of said oxidation catalyst; and
a computer storage medium having a computer program encoded therein, comprising:
 code for providing an indication that said SCR catalyst is degraded; and
 in response to said indication, discontinuing urea injection into said SCR catalyst and injecting a predetermined amount of reductant into an exhaust gas stream entering said ALNC wherein said predetermined amount of reductant is based on an amount of NOx in said exhaust gas mixture entering said ALNC.

* * * * *